3,010,947
VINYL THIOCYANATE AND POLYMERS
THEREOF
Jesse C. H. Hwa, Levittown, Pa., assignor to Rohm & Haas Company, Philadelphia, Pa., a corporation of Delaware
No Drawing. Filed June 1, 1955, Ser. No. 512,569
9 Claims. (Cl. 260—79.7)

This invention relates to vinyl thiocyanate, $$CH_2=CH-S-C\equiv N$$

and to its homopolymers and copolymers.

Vinyl thiocyanate may be prepared by the dehydrohalogenation of β-chloroethyl thiocyanate or β-bromoethyl thiocyanate. The dehydrohalogenation may be carried out at temperatures from about 10° C. to the boiling point of the reaction mixture; but a temperature from about 50° C. to about 80° C. is preferred. The β-haloethyl thiocyanate is reacted with a hydrogen halide-acceptor. Such hydrogen halide-acceptors are well known as being those strongly basic compounds which react readily with hydrogen chloride and hydrogen bromide. They are typified by the following: hydroxides of the alkali metals preferably sodium hydroxide; alkoxides, such as sodium ethoxide and potassium tert-butoxide; tertiary amines such as triethylamine, tributylamine, dimethylbenzylamine, quinoline, and pyridine; quaternary ammonium hydroxides, such as trimethylbenzylammonium hydroxide, methylethylbenzylammonium hydroxide, and the like.

A solvent may be present during the dehydrohalogenation reaction, although a solvent is not essential. Suitable solvents include the common organic liquids which are chemically inert under the conditions employed and which are typified by ethanol, benzene, toluene, xylene, diethyl ether and the like. Of these, benzene is entirely satisfactory and is preferred.

Although a catalyst is not necessary, the use of an iodide, such as sodium iodide, or potassium iodide, is recommended, particularly in the dehydrochlorination of β-chloroethyl thiocyanate.

Vinyl thiocyanate undergoes addition polymerization alone and with other compounds containing a vinylidene group, $CH_2=C<$. Such polymerization can be carried out in bulk or in solution, in emulsion or in suspension.

Examples of copolymerizable materials which give rise to thermoplastic copolymers with the products of this invention include the following: N-dialkyl acrylamides such as dimethyl acrylamide and diethyl acrylamide; esters of acrylic, α-chloroacrylic and methacrylic acids such as methyl acrylate, ethyl acrylate, 2-ethylhexyl acrylate, methyl methacrylate, tert-butyl methacrylate, octyl methacrylates, butyl chloroacrylates and lauryl chloroacrylate; vinyl hydrocarbons such as styrene, α-methylstyrene, vinylnaphthalene and vinyltoluene; vinyl chloride and vinylidene chloride; allyl and methallyl esters of saturated aliphatic carboxylic acids such as allyl acetate and methallyl propionate; acrylonitrile; vinylpyridine and the like.

It should also be pointed out that vinyl thiocyanate is also copolymerizable with compounds like divinylbenzene, trivinylbenzene and diallyl phthalate, which contain a plurality of vinylidene groups but that the resultant copolymers are cross-linked and consequently non-thermoplastic.

Vinyl thiocyanate can be copolymerized in all proportions with the materials noted above; and the particular ratio of comonomers chosen depends upon the desired end-use of the copolymer.

Polymerization and copolymerization of vinyl thiocyanate are accelerated by the use of heat, ultraviolet light and free-radical catalysts. The following are typical of suitable catalysts: dimethyl, diethyl or dibutyl azodiisobutyrates, azodiisobutyramide, azodiisobutyronitrile, azobis(α-methylbutyronitrile), azobis(α-methylvaleronitrile), dimethyl or diethyl azobismethylvalerate, benzoyl peroxide, acetyl peroxide, lauroyl peroxide, tert-butyl hydroperoxide, di-tert-butyl peroxide, tert-butyl perbenzoate, stearoyl peroxide, cumene hydroperoxide, and "per salts" such as ammonium persulfate and ammonium perborate. The catalysts are used in an amount from 0.01% to 5%, and preferably from 0.02% to 2%, based on the weight of the polymerizable compounds.

The polymers and copolymers of vinyl thiocyanate are capable of undergoing second-stage polymerization on ageing or on being heated, as a result of which cross-linking occurs and the previously thermoplastic polymers and copolymers lose their solubility and become thermoset. It is believed that the formation of a disulfide linkage is responsible for this change. This property makes them especially useful in surface coatings and in the manufacture of molded objects.

The homopolymers of vinyl thiocyanate are clear, brittle resins. The insoluble polymers which are cross-linked as a result of having been heated or because they are copolymers of vinyl thiocyanate and a polyvinylidene compound, such as divinylbenzene, can be oxidized to cation-exchange resins which contain sulfonate groups as their functional, cation-exchanging groups. Furthermore cation-exchange resins, containing both sulfonic and carboxyl groups, are readily made by the oxidation of the thiocyanate groups and hydrolysis of the ester groups in a copolymer of vinyl thiocyanate and a lower alkyl ester of acrylic acid or of methacrylic acid, such as ethyl acrylate or methyl methacrylate. Such resins are the subject of another of my applications for Letters Patent, Serial No. 512,570, filed June 1, 1955.

The following examples, in which all parts are by weight, serve to illustrate the preparation and use of vinyl thiocyanate.

*Example 1*

Into a reactor equipped with stirrer and thermometer was charged the following: 166 parts (1 mole) of β-bromoethyl thiocyanate, 114 parts (1.1 moles) of triethylamine, 300 parts of benzene and 0.5 part of quinone. (The β-bromoethylthiocyanate had been prepared by reacting an excess of ethylene dibromide with sodium thiocyanate in ethanol at refluxing temperature.) The stirred mixture was heated to 65° C. and was held between 65° C. and 75° C. for 2¾ hours. The mixture was cooled to room temperature and the precipitated amine salt was removed by filtration. The filtrate was fractionally distilled and an 80% yield of vinyl thiocyanate was obtained. Its composition was verified by analysis. The product was a colorless liquid of disagreeable odor. It was soluble in common organic liquids but was sparingly soluble in water. It boiled at 53° to 53.5° C./62 mm. (Hg) and its index of refraction was $n_D^{20}$ 1.4878.

*Example 2*

A mixture of 61 parts (0.5 mole) of β-chloroethyl thiocyanate, 74 parts (0.55 mole) of dimethylbenzylamine, 75 parts of sodium iodide, 150 parts of benzene and 0.3 part of quinone was heated at 70° to 75° C. for 3¾ hours. The product was isolated in the manner described in Example 1 above. A 50% yield of vinyl thiocyanate, identical with the product of Example 1, was obtained.

*Example 3*

A glass container was filled with vinyl thiocyanate containing 1% dimethyl bisazoisobutyrate as a catalyst. The container was sealed in an atmosphere of nitrogen and the contents were heated at 70° C. for 16 hours. A viscous mass was obtained. The material was dissolved in acetone and then methanol was added until precipitation was complete. The precipitate was removed by filtration and was dried. The final product was a powder which was soluble in acetone and dimethylformamide and insoluble in water, benzene, carbon tetrachloride, octane and carbon disulfide. The resinous product became insoluble in acetone on standing at room temperature for two days. The powder on being melted formed a clear, brittle, resinous mass.

*Example 4*

A copolymer of vinyl thiocyanate and butyl acrylate was made as follows: Into a flask equipped with a thermometer and stirrer was placed a mixture of 95 parts of butyl acrylate, 5 parts of vinyl thiocyanate, 280 parts of water and 9 parts of a non-ionic dispersing agent (a 70% aqueous solution of a tert-octylphenoxypolyethoxyethanol). An aqueous solution containing 0.12 part of ammonium persulfate and 0.16 part of sodium hydrosulfite was added to the stirred mixture and an exothermic reaction soon took place which carried the temperature up to 42° C. at which point an ice-bath was applied until the temperature had fallen to room temperature. All of this procedure required about 35 minutes.

The product was a uniform dispersion of a copolymer of vinyl thiocyanate and butyl acrylate. Some of the dispersion was applied to a glass plate; and on drying at room temperature, it deposited a clear, colorless, tacky, continuous film. This film, which was soluble in acetone, gradually became insoluble on standing at room temperature or on being heated. It was also applied to leather and served as an excellent undercoater for leather finishes.

The dispersion of resin was applied to wool flannel and had a marked effect in stabilizing the wool against shrinkage.

Dispersions of other copolymers are made in the same way by merely varying the ratio of the vinyl thiocyanate and substituting another copolymerizable compound containing at least one vinylidene group, $CH_2=C<$.

*Example 5*

This illustrates the preparation of solutions of copolymers, which solutions are suitable as surface coatings.

Thus, a mixture of 131 parts of methyl methacrylate, 108 parts of ethyl acrylate, 13 parts of vinyl thiocyanate, 250 parts of toluene and 1.6 parts of azoisobutyronitrile was stirred and heated at 60° C. for 7 hours. The resultant solution, on cooling to room temperature, was clear and syrupy. Dried films of the product were clear and colorless.

*Example 6*

A mixture of 255 parts of vinyl thiocyanate, 29.1 parts of commercial divinylbenzene (approximately 50% divinylbenzene) and 3 parts of dimethyl azobisisobutyrate was suspended in an aqueous phase consisting of 1000 parts of water and 85 parts of a 1.5% aqueous dispersion of magnesium silicate. The mixture was stirred and heated under an atmosphere of nitrogen at 88° to 92° C. for 8 hours. The hard, spheroidal particles of resin were then filtered off, thoroughly washed, and dried.

A mixture of 100 parts of the dried resin, 200 parts of sodium hydroxide, 800 parts of water and 160 parts of 30% hydrogen peroxide was stirred and heated to 80° C. in one hour in a reactor equipped with stirrer, thermometer and reflux condenser. Stirring and heating at 80° C. was continued for 8 hours, after which the beads of resin were removed by filtration and were thoroughly washed with water. The resin was next converted to the hydrogen form by soaking in a large excess of 2 N HCl for three hours, after which it was washed free of acid with water. The product had a cation-exchange capacity of 3.46 milliequivalents per gram, dry.

I claim:
1. Polyvinyl thiocyanate.
2. An addition polymer of vinyl thiocyanate containing a significant amount of polymerized units of vinyl thiocyanate therein.
3. An addition copolymer containing copolymerized units of vinyl thiocyanate in significant amount and copolymerized units of at least one other copolymerizable compound containing at least one vinylidene group, $CH_2=C<$.
4. An addition copolymer containing copolymerized units of vinyl thiocyanate in significant amount and units of copolymerized divinylbenzene.
5. An addition copolymer containing units of copolymerized vinyl thiocyanate in significant amount and units of a copolymerized alkyl ester of acrylic acid.
6. An addition copolymer containing units of copolymerized vinyl thiocyanate in significant amount and units of a copolymerized alkyl ester of methacrylic acid.
7. An addition copolymer of vinyl thiocyanate and butyl acrylate containing a significant amount of polymerized units of vinyl thiocyanate therein.
8. An addition copolymer of vinyl thiocyanate and ethyl acrylate containing a significant amount of polymerized units of vinyl thiocyanate therein.
9. An addition copolymer of vinyl thiocyanate, ethyl acrylate, and methyl methacrylate containing a significant amount of polymerized units of vinyl thiocyanate therein.

References Cited in the file of this patent

UNITED STATES PATENTS

| | | |
|---|---|---|
| 2,757,190 | Jones | July 31, 1956 |
| 2,785,190 | Klopping | Mar. 12, 1957 |
| 2,818,395 | Hwa | Dec. 31, 1957 |

OTHER REFERENCES

Schildknecht: "Vinyl and Related Polymers," p. 638, Wiley (1952).